United States Patent [19]
Wheeler

[11] Patent Number: 5,931,637
[45] Date of Patent: *Aug. 3, 1999

[54] PROPELLER WITH VARIABLE RATE OF PITCH CHANGE

[75] Inventor: J. Lance Wheeler, Arlington, Wash.

[73] Assignee: Something Else Limited Liability Company, Arlington, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/589,845

[22] Filed: Jan. 22, 1996

[51] Int. Cl.$^6$ .................................................. B63H 3/00
[52] U.S. Cl. .............................. 416/35; 416/48; 416/161; 416/165; 416/167
[58] Field of Search ...................................... 416/161, 165, 416/167, 35, 48, 61

[56] References Cited

U.S. PATENT DOCUMENTS

| | | |
|---|---|---|
| 12,665 | 4/1855 | Boardman . |
| 15,638 | 9/1856 | Adkins . |
| Re. 18,957 | 9/1933 | Gobereau et al. . |
| 642,601 | 2/1900 | Gere . |
| 769,256 | 9/1904 | Enge . |
| 861,612 | 7/1907 | Shultz . |
| 1,374,786 | 4/1921 | Walker . |
| 1,404,269 | 1/1922 | Caldwell . |
| 1,425,922 | 8/1922 | Wesnigk . |
| 1,620,968 | 3/1927 | Heath . |
| 1,722,182 | 7/1929 | Taylor . |
| 1,747,230 | 2/1930 | Duprey . |
| 1,773,550 | 8/1930 | Scott . |
| 1,810,159 | 6/1931 | Carol . |
| 1,837,318 | 12/1931 | Eustis . |
| 1,877,821 | 9/1932 | Covey . |
| 1,915,465 | 6/1933 | Kohlstedt . |
| 2,054,810 | 9/1936 | Gaba . |
| 2,118,652 | 5/1938 | Meijer . |
| 2,118,653 | 5/1938 | Meijer . |
| 2,127,264 | 8/1938 | Lampton . |
| 2,223,081 | 11/1940 | Thomas .................................... 170/162 |
| 2,297,142 | 9/1942 | German ................................ 416/239 X |
| 2,370,135 | 2/1945 | Berliner ................................... 416/162 |
| 2,443,239 | 6/1948 | Greenwood ............................. 416/205 |
| 2,474,635 | 6/1949 | Nichols .................................... 416/162 |
| 2,595,231 | 5/1952 | Dermond ............................. 170/135.7 |
| 2,792,897 | 5/1957 | Dagrell .................................... 416/165 |
| 2,850,106 | 9/1958 | Swan ....................................... 416/167 |
| 2,925,131 | 2/1960 | Willi ................................... 170/160.32 |
| 3,130,677 | 4/1964 | Liebhart .................................. 417/336 |
| 3,163,231 | 12/1964 | Barnes et al. ...................... 170/135.24 |
| 3,242,992 | 3/1966 | Quenneville et al. .................. 416/158 |
| 3,356,152 | 12/1967 | Accorsi .............................. 170/135.74 |
| 3,380,535 | 4/1968 | Biermann ............................. 170/160.2 |
| 3,567,340 | 3/1971 | Schneider et al. ....................... 416/162 |
| 3,876,329 | 4/1975 | Miller ........................................ 416/28 |
| 3,876,334 | 4/1975 | Andrews ................................. 416/160 |

(List continued on next page.)

FOREIGN PATENT DOCUMENTS

| | | |
|---|---|---|
| 544926 | 8/1957 | Canada . |
| 1095464 | 6/1955 | France . |
| 1 003 912 | 3/1957 | Germany . |
| 32 05 216 | 9/1982 | Germany . |
| 3309840A1 | 9/1984 | Germany ........................ B64C 11/40 |
| 34 06 634 | 8/1985 | Germany . |
| 55-134800 | 10/1980 | Japan . |
| 59-149890 | 8/1984 | Japan . |
| 61-77593 | 4/1986 | Japan . |
| 61-77594 | 4/1986 | Japan . |
| 703458 | 2/1954 | United Kingdom . |
| 822469 | 10/1959 | United Kingdom . |
| 860205 | 2/1961 | United Kingdom . |
| 2 051 966 | 1/1981 | United Kingdom . |
| 2 051 967 | 1/1981 | United Kingdom . |

*Primary Examiner*—Thomas E. Denion
*Attorney, Agent, or Firm*—Sheridan Ross P.C.

[57] ABSTRACT

A propeller is controlled to change pitch at at least two different rates. In one embodiment, an electric motor is provided with a high or low voltage for driving a pitch change mechanism at a high or low change rate. Preferably the rate is selected automatically. Preferably, the high rate is not used unless the current pitch is below a threshold.

15 Claims, 3 Drawing Sheets

U.S. PATENT DOCUMENTS

| | | | |
|---|---|---|---|
| 3,900,274 | 8/1975 | Johnston et al. | 416/155 |
| 4,037,986 | 7/1977 | Chilman | 416/46 |
| 4,260,329 | 4/1981 | Bjorknas | 416/43 |
| 4,523,891 | 6/1985 | Schwartz et al. | 416/157 R |
| 4,643,643 | 2/1987 | Otto | 416/154 |
| 4,778,344 | 10/1988 | Water | 416/239 |
| 4,892,269 | 1/1990 | Greco et al. | 244/53 R |
| 4,930,725 | 6/1990 | Thompson et al. | 244/53 R |
| 4,993,919 | 2/1991 | Schneider | 416/35 |
| 5,029,091 | 7/1991 | Schneider et al. | . |
| 5,090,869 | 2/1992 | Wright | . |
| 5,209,640 | 5/1993 | Moriya | 416/27 |
| 5,242,265 | 9/1993 | Hora et al. | 416/26 |
| 5,281,094 | 1/1994 | McCarty et al. | 416/147 |
| 5,281,095 | 1/1994 | Komura et al. | . |
| 5,284,418 | 2/1994 | Moriya | 416/35 |
| 5,286,166 | 2/1994 | Steward | 416/89 |

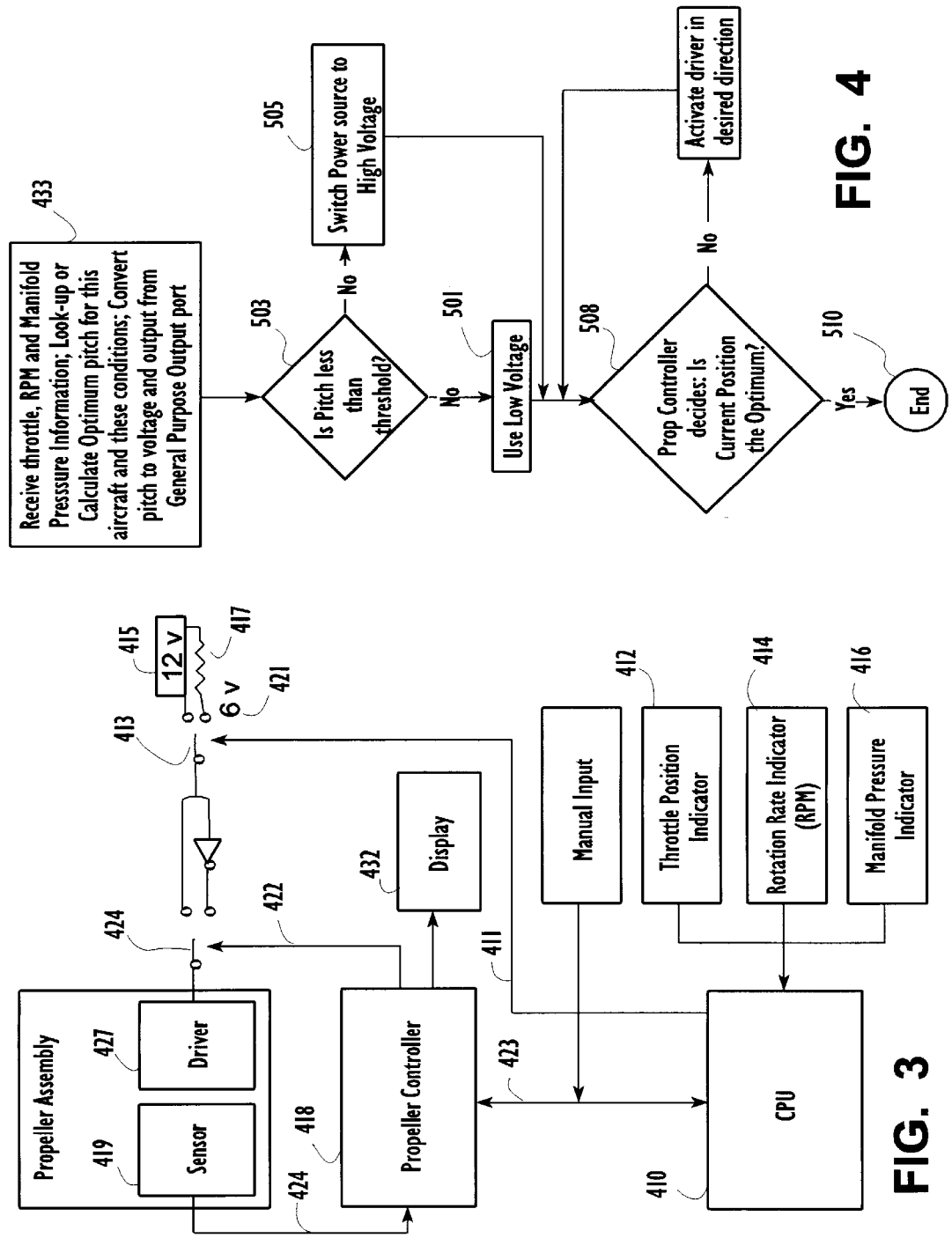

PROPELLER WITH VARIABLE RATE OF PITCH CHANGE

Cross reference is made to application Ser. No. 08/418,528, filed Apr. 7, 1995, for Variable Pitch Propeller commonly assigned herewith and incorporated herein by reference.

The present invention relates to a propeller with variable rate of changes in pitch, and in particular to an aircraft propeller which can be controlled to change propeller pitch at a first rate or a second, higher rate.

BACKGROUND INFORMATION

Although a number of systems for changing aircraft propeller pitch have been proposed, many previous systems are designed to provide a change in propeller pitch which occurs at a constant predetermined rate and/or which cannot change in rate depending on conditions or under the control of the pilot. It has been found that there are certain circumstances in which it would be desirable to change propeller pitch at different rates. For example, during flight conditions, it is typically preferred to provide a relatively slow rate of pitch change such as providing for a change between about 1/10 and about 2/3 degree per second, commonly about 1/3 degree change in pitch per second. In taxiing or other on-ground conditions, however, it would be desirable to provide for more rapid change in propeller pitch, e.g. to provide for greater maneuverability on the ground. There is a particular need for the greater maneuverability which could result from rapid propeller pitch change in connection with sea planes which are attempting to maneuver on the water, e.g. approaching a dock or other structure.

On the other hand, a rapid change in pitch during flight conditions might best be avoided, e.g. to avoid loss of control or excess stress on propeller or other parts. Many previous devices fail to include a system to avoid rapid pitch changes or to prevent switching to a rapid pitch change rate during certain conditions, e.g. typical flight conditions.

Additionally, a number of variable pitch systems are relatively expensive, thus placing the benefits of variable pitch, and particularly multiple-speed of pitch change, in a cost range which is impractical or infeasible for small (e.g. single engines), experimental, light or hobbyist aircraft.

Accordingly, it would be advantageous to provide an aircraft propeller system which permitted changing the propeller pitch at two or more different rates, preferably depending on the condition of the aircraft or under control of the pilot. It would further be advantageous to provide a system which would prevent high or excessive pitch change rates during flight or other conditions. Additionally, it would be advantageous to provide such a system which would be sufficiently inexpensive to make it feasible for use in small, experimental, light or hobbyist planes yet which is reliable, safe, durable and easy to use and/or maintain.

SUMMARY OF THE INVENTION

The present invention provides for an aircraft propeller having a pitch which can be changed at either a first rate or a second, higher rate. Preferably, the high rate of change is available only in certain conditions such as when the current propeller pitch is relatively low (e.g. less than about 10°) or under other conditions associated with aircraft that are not in flight, such as low propeller RPM, low air speed, low altimeter reading, etc. (or combinations thereof). Providing for control of pitch particularly on the ground, is of particular use in connection with small engine aircraft since it becomes feasible to start the engine at 0 pitch, and thus 0 load, which is a much safer procedure and also permits use of a simplified engine ignition procedure and apparatus.

In one embodiment, the propeller pitch change mechanism is driven by an electric motor which can be powered by either a low voltage source or a high voltage source. Selection of the high voltage source causes a pitch change at a rate higher than that resulting from driving the motor from the low voltage source.

BRIEF DESCRIPTION OF THE DRAWINGS

FIG. 3 is a block diagram of a pitch control system according to an embodiment of the present invention; and FIG. 4 is a flow diagram of a process for pitch control according to an embodiment of the present invention.

DETAILED DESCRIPTION OF THE PREFERRED EMBODIMENTS

Figure 1:
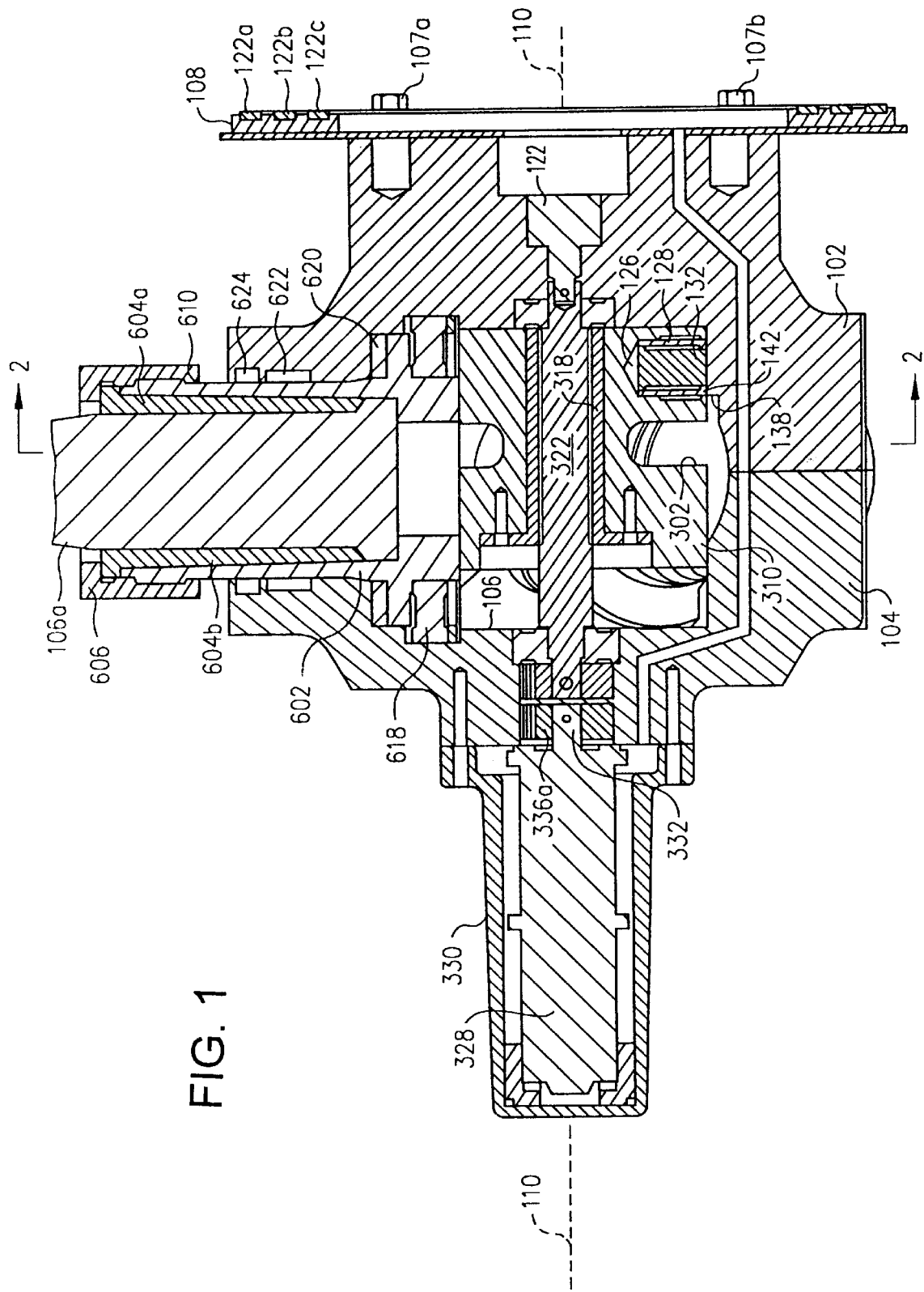
FIG. 1 is a longitudinal cross sectional view of a variable pitch propeller apparatus.

The present invention provides for changing pitch of an aircraft propeller at two or more different rates and can be used in connection with a number of different types of propeller pitch adjustment devices. One such device is that described in Ser. No. 08/418,528, filed Apr. 7, 1995 for Variable Pitch Propeller, incorporated herein by reference, and depicted generally in FIGS. 1 and 2.

In general terms, as described in greater detail below, pitch of the propeller blades is changed when electric motor 328 drives a lead screw shaft 322 to axially move actuator 310 to cause movement of socket pin 308 and consequent rotation of socket assembly 112 and the attached blade 106, effecting a change in the blade pitch. Thus it can be seen that the speed at which motor 328 drives the shaft 322 determines the speed at which the blade 106a changes pitch.

In one embodiment, electric motor 328 is configured to rotate at two different speeds in response to receiving power at two different voltages. A number of motors can be used for this purpose. One preferred system uses a permanent magnet DC motor coupled to a four-stage planetary gearbox that drives an acme thread screw. In one embodiment, model 407A6186 available from Globe Motors Division of Labinal Components and Systems, Inc. is used. In one configuration, when the motor 328 receives power at about 4.5 volts, it drives shaft 322 at a rate which changes propeller pitch at a rate of about 1/3 degree per second. When the motor 328 receives power at about 12 volts, it drives shaft 322 at a rate which changes propeller pitch at a rate of about one degree per second. In one embodiment, the motor is rated or configured for normal operation at about 6 volts, however, because pitch change at the high change rate is sustained for only short time periods (e.g. less than about 10 seconds, preferably less than about 7 seconds), and because the high rate is preferably permitted only in low-load (e.g. on-ground or on-water) conditions, the motor is not significantly damaged or affected by the relatively high voltage.

In one embodiment the blade pitch is controlled automatically. In the embodiment depicted in FIG. 3, a computer having a central processing unit (CPU) 410 receives information from which optimal blade pitch can be calculated. In the present context, preference to an "optimal" pitch is not necessarily limited to a single, mathematically precise optimal value. Those in the art recognize that there may be a certain amount of indeterminacy or imprecision regarding desirable propeller pitch and in this context propeller pitch is optimized if the pitch is better than at least some other possible propeller pitch for a given set of conditions. In one embodiment, the information received by the CPU includes throttle position (provided by throttle position indicator 412) crankshaft rpm (provided by a rotation rate indicator 414 such as a Hall effect sensor) and manifold pressure (provided by manifold pressure indicator 416). The blade pitch which is optimal for a given throttle rpm and manifold pressure will depend on the flight characteristics of the aircraft concerned. In one embodiment the computer executes a program which calculates a optimal pitch based on a formula developed specifically for the flight characteristics of the aircraft. In another embodiment, a table containing optimal pitch for various throttle rpm and manifold pressure conditions for the aircraft is stored in memory and, in a manner well known to those skilled in the art, the optimum propeller pitch is obtained by looking up a pitch from an optimum propeller pitch table. In one embodiment the computer outputs an analog signal such as a voltage between zero and five volts corresponding to the desired or optimal propeller pitch.

Although it is possible to provide for manual control or selection of the rate of pitch change, preferably, the pitch change rate is selected automatically, i.e. without manual control or selection. In the depicted embodiment the computer outputs a signal 411 to control the voltage of the power which is used to drive the motor 328, e.g. by setting relay 413. In the depicted embodiment, a 12 volt power supply 415 is available for driving the motor 328 at a fast rate and a resistor 417 is configured, e.g. as a voltage divider, to provide a lower voltage, (e.g. 6 volts or less, preferably 4.5 to 5 volts) for driving the motor 328 at a slow rate. Although other devices for providing a lower voltage could be used (e.g. a transformer) the depicted configuration is believed to provide for low cost and mass (and thus low weight and rotational inertia) of the system.

Preferably, the computer selects the voltage (and thus the pitch change rate) depending on the condition of the aircraft. The computer may receive pitch information from the propeller controller 418, as depicted (which obtains the information via sensor 419 and line 424) or directly from the sensor 419. Preferably, high pitch change rate is permitted only when the aircraft is on the ground (or on the water), or if a condition is sensed which typically occurs only when the aircraft is on the ground or on the water. In one embodiment, the computer selects the higher voltage only if the current pitch of the propeller (as determined by sensor 419) is less than a threshold value (e.g. less than about ten degrees, preferably less than about nine degrees, more preferably less than about 8 degrees). It would also be possible to prevent a high pitch change rate if the RPM exceeded a threshold, if the throttle position exceeded a threshold, if airspeed exceeded a threshold, if the altimeter reading exceeded a threshold and the like. Further, if desired, a combination of factors may be used, such as preventing high pitch change rate if RPM exceeds a threshold or altimeter reading exceeds a threshold. As described below, in one embodiment, a mechanical lock-out device prevents moving from a pitch which is greater than ten degrees to a pitch which is less than ten degrees if the propeller RPM exceeds a threshold. Thus in this embodiment, by preventing a high pitch change rate if the pitch is greater than 10 degrees, it will be impossible to switch to a high pitch change rate until the propeller RPM drops below the RPM threshold. Preferably, the computer sets the relay 413 to use low voltage 501 unless the pitch is below the threshold 503, in which case, high voltage is used 505.

The analog signal 423 is received by a propeller controller 418. The controller receives information from the sensor 419 related to the current pitch position and provides commands to the driver 427, e.g. motor 328 for making any pitch adjustments that may be necessary. The propeller controller 418 performs signal conditioning, effectively translating between the analog signal output by the CPU indicating the desired pitch and the signals 422, 424 (preferably conveyed over commutator rings 122) which may have a different signal format such as different ranges of voltages, or which may be digital rather than analog signals. In one embodiment the driver device 328 is a DC motor and signal 422 control relay 429 to selectively apply power to the motor 328 with polarity (set by relay 429) determining direction (clockwise or counterclockwise) of rotation. In other embodiments, the driver 328 may be stepper motor, or other electric motor or maybe a non-electric driver system such as spring driven, a pneumatic or hydraulic system, or the like.

As depicted in FIG. 4, in one embodiment the CPU 410 will receive 433 the throttle rpm and manifold pressure information 502. The CPU 410 then calculates or looks up the optimum pitch for this particular aircraft and these conditions. This information is converted into a voltage and is output, e.g. from a general purpose output port. The propeller controller 418 then determines, e.g., based on the value of variable resistor, obtained on line 424, whether the current pitch is already equal to or sufficiently close to an optimum pitch 508. If so, the procedure ends 510 and another iteration of control can commence. If the pitch is not currently optimum, the propeller controller 418 outputs a signal over line 422 to actuate the driver 328 in the desired direction (clockwise or counterclockwise in order to drive the actuator 318 fore or aft 512). The controller 418 then determines, e.g., via a signal on line 424, if the pitch is now optimum and the process repeats until an optimum position is achieved 510.

In one embodiment, the pilot is permitted to manually adjust pitch by providing a manual input 432 to the propeller controller which will preferably override any commands issued by the CPU 410. In one embodiment, the pilot can disable automatic pitch control. When automatic pitch control is in effect, the pilot will typically control only the throttle.

Preferably the propeller controller 418 also outputs a display 432 of the current propeller pitch which can be read by the pilot. In one embodiment, the pitch is displayed to a precision of about 0.5°. Although it is possible to provide for finer-precision output (e.g. a precision of about 0.1 degrees), providing a precision of about 0.5° is believed to avoid at least some fluctuations in display that may arise from signal noise. Preferably the display 432 is provided regardless of whether the pitch is being controlled automatically, e.g. by a computer 410. In one embodiment, the propeller blades are driven to a known pitch (e.g. an extreme pitch) and the display 432 is calibrated to correctly display the known pitch.

Preferably, the propeller controller 418 outputs a warning if the propeller blade pitch becomes negative. In one embodiment, when the pitch is zero or negative, the display 432 alternates between a display of the word "beta" and the numerical value of the pitch (e.g. in degrees), such as displaying "beta for 1 second and the value for 2 seconds, and repeating. Other kinds of indications of negative pitch are possible, such as providing a negative sign before the numerical value or providing a flashing decimal point in the pitch angle indicator display 432. However, it is believed the flashing display with the word "beta" is more likely to bring this important information to the attention of the pilot. In one embodiment the propeller controller 418 outputs an indication of an overload condition in the motor 328. This can be achieved by monitoring the amount of current being drawn by the motor 328. An overload condition can be sensed as a current draw greater than a predetermined threshold, e.g. 1 ½ amps. An overload condition may indicate that the lockout pin, 128 has contacted the stop position 138. However, an overload condition can also mean that the system is binding in some fashion and thus may provide a useful indication of a need for maintenance. In one embodiment, the display can also be used in aircraft that have a redundant ignition system (as described, e.g. in U.S. Ser. No. 08/530,050, filed Sep. 19, 1995, for Redundant Ignition System For Internal Combustion Engine, incorporated herein by reference), to provide a signal when there is a change in the redundant ignition system. For example the display may read "IGN A" or "IGN B" when the ignition system which is being used changes. This is believed to provide a readily apparent and noticeable indication to the pilot who might otherwise be unaware that the redundant system is being used (possibly meaning that only one of the two redundant systems is currently operative), giving the pilot an opportunity to land and have the aircraft serviced.

Figure 2:
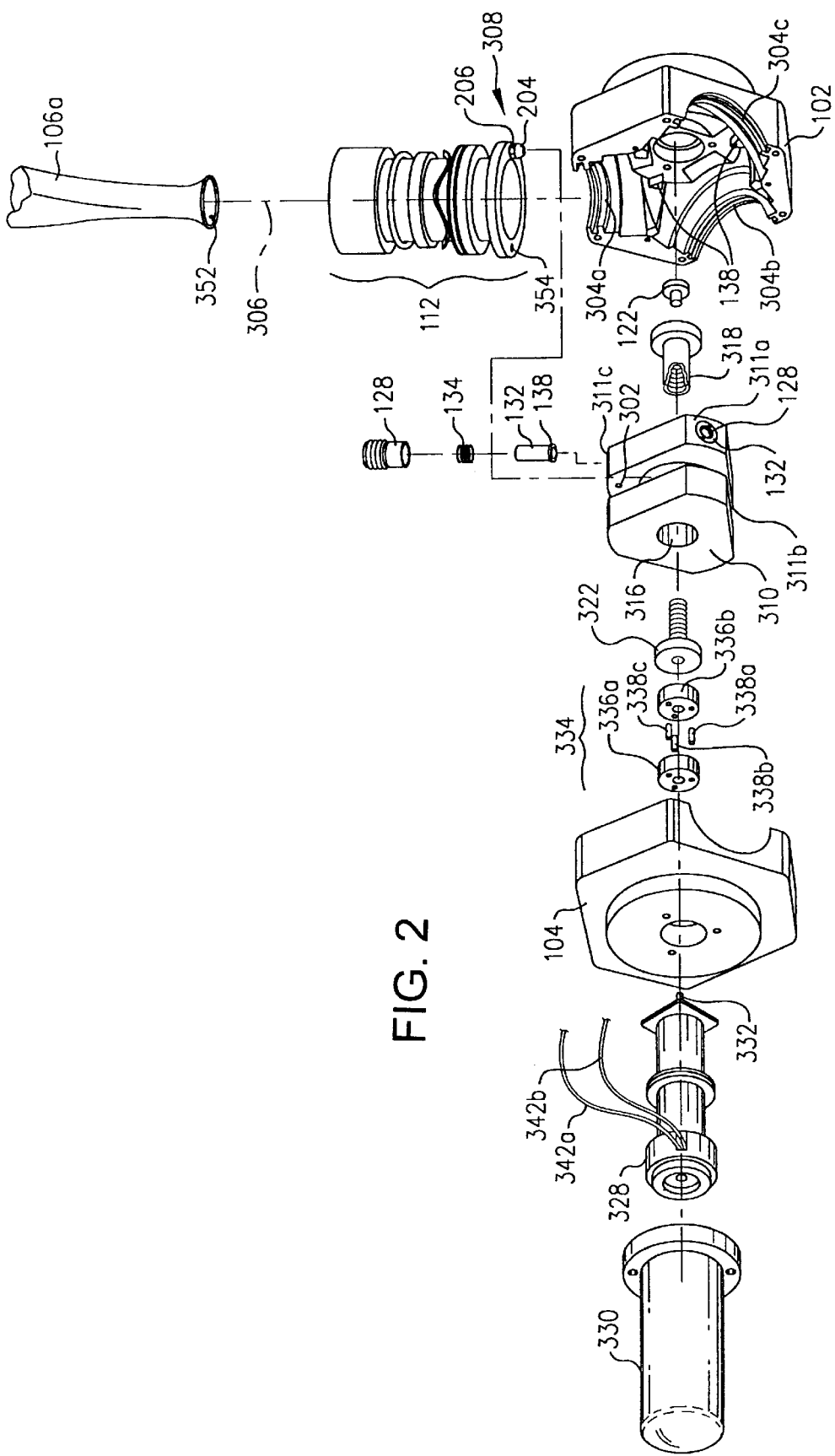
FIG. 2 is an exploded perspective view of a variable pitch propeller apparatus.

As depicted in FIG. 1, in one embodiment of the invention a propeller hub made of a hub back half 102 and hub front half 104 hold a plurality of propeller blade 106a. The hub 104, 102 is coupled to a drive plate 108, e.g., by bolting, which is driven by a drive shaft (non shown) for rotation along a rotation axis 110. Each propeller blade 106a is held in the hub 102, 104 by a separate blade socket assembly 112. The socket assembly 112 fits in the groove hub openings 304a, 304b, 304c and is rotatable, therein about the blade longitudinal axis 306 (FIG. 2). Preferably the axis of longitudinal rotation of the blade lies substantially along the center of lift of the blade during normal blade operation. By providing pivoting along the center of lift, rotation of the blade along its longitudinal axis is easier since there is little off-axis torque or force. The blade 106a is non-rotatably coupled to the socket assembly 112 such that rotation of the socket assembly 112 about axis 306 causes rotation of the blade 106A about axis 306 thus resulting in a change of blade pitch.

Rotation of the socket assembly 112 is effected by creating a force, parallel to the rotation axis 110 on the socket pin assembly 308 which is made up of shoulder bolt 204 and washer 206. Socket pin 308 fits snugly within a groove 302 formed in actuator 310. Actuator 310 resides in a cavity 106 defined by mating hub sections 102, 104. Actuator 302 is axially movable within the cavity 106 along rotation axis 110 to move, e.g., from the aft-most position depicted in FIG. 1 to a more forward position. As the actuator 310 moves along axis 110 the socket pin 308, being engaged in the actuator 302 is also moved in a path having an axial component parallel to axis 110 and, simultaneously, slides circumferentially within groove 302, causing socket assembly 112 to rotate about axis 306 and thus change the pitch of blade 106a. In the depicted embodiment, a socket assembly and blade combination are positioned in each of the hub openings 304a, 304b, 304c and include pins engaged in actuator groove 302 so that all blades will undergo simultaneous and equal changes in pitch in response to movement of the actuator 310.

The actuator 310 can be driven to various axial positions by a lead screw device driven by an electric motor. In the depicted embodiment, the actuator 310 has a central hole 316 for receiving a lead nut or drive nut 318. Drive nut 318 has internal threading engaging with external threads of drive screw or lead screw 322. Preferably the lead screw and lead nut are tight-fitting with very small tolerance such as a tolerance of about ±0.003 inches (about 0.7 mm). Providing such a tight tolerance helps to avoid departure or vibration of the blade from the desired pitch. It is believed less expensive to provide the actuator body 310 and lead nut 318 as coupled but non-integral (i.e., separately-formed) bodies. Further, it is preferred that at least one wall of the actuator groove 302 be formed of a material with a resiliency higher than that suitable for the lead nut, where high resiliency and/or inability to provide close tolerance with the lead screw can cause undesirable backlash. Drive assembly 310 is shaped to fit within a correspondingly-shaped cavity 106 and thus is constrained against rotation about rotation axis 110. Lead screw 322 is constrained, e.g., by bearings, against axial movement along axis 110. As a result, when lead screw 322 is driven to rotate around axis 110 as described below, lead nut 318 travels axially in response along axis 110 carrying with it actuator 310 to which it is coupled and ultimately resulting in a change in blade pitch as described above. The location of the pin assembly 308 along the circumference of the blade root, i.e. with respect to the blade air foil shape, will determine what pitches are available (forward pitch, reverse pitch) within the predefined range of pitches. In one embodiment the blade root is provided with a dimple 352 which can be aligned with a corresponding dimple or hole 354 to provide accurate orientation of the socket assembly 112 and thus of the pin 308 with respect to the airfoil shape of the blade 106a.

In the depicted embodiment, an electric motor 328, covered by motor cover 330 rotates a drive shaft 332. Rotation of the drive shaft 332 is transmitted to the lead screw 322 by a coupling 334 made up of a first coupling disk 336a rigidly coupled to drive shaft 332, a second coupling disk 336b rigidly coupled to lead screw 322 and coupling pins 338a, 338b, 338c extending therebetween and fitted in corresponding sockets on the coupling disks 336a, 336b. The pin coupling provides some isolation of the motor 328 from, e.g., vibration, contributes to ease of fabrication and forms a preferred failure point to prevent damage or failure of e.g., the lead screw.

In the depicted embodiment, the hub and all contained components rotate, as a unit, about longitudinal axis 110 in response to driving of the drive plate 108. Thus when it is stated, e.g., that the actuator 310 is constrained against rotation about axis 110 it is meant that the actuator 310 is constrained against rotation with respect to the housing 102, 104.

Preferably there is a relatively large amount of force required to move the actuator 310. In particular, the mechanical advantage involved in transmitting rotational force from the blade 106a to the actuator 310 should be sufficiently small that aerodynamic or other forces on the blade 106 tending to make the blade rotate around axis 306 are unable to effect movement of the actuator 310. In this way, if there is a mechanical failure such that the actuator 310 is no longer held in its axial position by, e.g., the coupled lead screw 322, the actuator 310 will nevertheless remain substantially in place, axially, because of the insufficiency of mechanical advantage for moving the actuator 310.

Preferably the motor 328 is controllable, e.g. to permit automatic and/or manual changes in blade pitch. In order to provide power and control signals or other communication to components within the rotating hub, one or more commutator or slip rings 122a, 122b, 112c are provided on the drive plate 108 for transmitting power and communication via, e.g., brushes (not shown) to and from voltage sources, a controller, computer or other electrical or electronic device. Communication between the commutator rings 122 and electrical components such as the motor 328 are provided over wires 342a, 342b accommodated in wire channels in the hub 102, 104. Information about the current location of the actuator 310 and thus the current blade pitch can be provided from a sensor or position encoder 122 via the commutator rings 122a, 122b, 122c. In one embodiment the sensor 122 is a ten turn potentiometer while the lead screw and lead nut provide, e.g. and eight turn range. The potentiometer thus can provide a variable resistor for providing an indication of a position of the actuator 310 and thus the pitch of the blade 106 over line 424.

If desired, the hub 102, 104 can be driven by providing an adapter disk or plate 109 with appropriate wiring holes 111 between the drive plate 108 and the hub back half 102 for the purpose, e.g., of accommodating different bolt patterns 105a, 105b, 107a, 107b for various types of drive plates 108.

In the depicted embodiment, the actuator 310 includes a plurality of radial wells 126 for receiving a lockout housing 128 holding a lockout pin 132. A spring 134 is captured between a lockout pin rim 138 and a housing lip 142 urging the pin 132 to a position substantially interior of the lockout housing 128 as depicted in FIG. 1. When the lockout pin is in the retracted (unextended) configuration depicted in FIG. 1, the blade pitch can be changed within a first, full range of pitch, such as a range of about 45°. When the actuator 310 is moved to a forward position the lockout pin 132 will continue to be retained in housing 128 unless the hub and propellers are rotating about rotation axis 110 at a sufficiently high rate of rotation. At a sufficiently high rotation rate, centrifugal force will cause the lockout pin 128 to move radially outward against the urging of spring 134, e.g. to the position depicted in FIG. 1B. In one embodiment, three lockout pins are provided, one in each lobe 311, 311b, 311c of the actuator 310. Axially aligned with each lockout pin 132 is a shoulder 138 formed in the rear housing half 102. When the lockout pin 128 is in the centrifugally extended position depicted in FIG. 1B, as the actuator 310 is driven aft, the edge of the lockout pin 128 will contact the ledge 138 preventing further axial movement of the actuator 310 (and thus further pitch changes resulting from such further aft axial movement) at least until the propeller rotation rate drops to a rate at which the force of spring 134 exceeds centrifugal force on the pin 128. The effect, thus, is to limit the range of available propeller blade pitch changes while the propeller is moving faster than a predetermined rpm (revolutions per minute). This feature can be used to prevent the propeller blades from being moved to a undesirably small and/or negative pitch during flight, (i.e. when the propeller is rotating at a relatively high rotation rate). However, driving the propeller blades to a small or negative pitch is still permitted when propeller rotation rate is relatively small as will typically be the case when the aircraft is on the ground. By providing three lockout pins, a triply redundant safety system is provided.

In light of the above description a number of advantages of the present invention can be seen. The present invention provides for changing pitch at two or more different rates. Preferably the pitch change rate is selected automatically and a high change rate is prevented unless the aircraft is on the ground (or on water). The system is relatively inexpensive, reliable and safe and preferably provides clear and noticeable pitch and other indications to the pilot.

A number of variations and modifications of the invention can be used. Some aspects of the invention can be used without using other aspects. For example, it is possible to provide two or more rates of pitch change without preventing the high rate under certain aircraft conditions. It is possible to provide automatic control of pitch change rate without providing display of pitch. Although a lead screw mechanism for moving an actuator is provided, other ways of moving the pin 308 can be used including linear motors, rack and pinion systems and the like. Rather than controlling the speed of motor 328 by varying voltage, it would be possible to provide a system in which current change was used to control motor speed; however this system might require a relatively high-precision regulated power supply, which may undesirably add to the cost. Although a computer 410 is used for selecting the pitch change rate in the embodiment of FIG. 3, selection can also be performed by other devices such as a hand-wired logic device, an application specific integrated circuit (ASIC), a programmable logic device, or by the propeller controller. Although a voltage control of motor speed has been described, it is possible to control motor speed in other manners, including a multiple speed gearbox, multiple ratio reduction, a variable ratio screw. Although a two-speed system has been described, three or more speeds of pitch change can be provided or the pitch change speed can be continuously variable. It is possible to calculate a desired pitch change rate using a formula based on one or more continuous variables, such as RPM, current pitch, airspeed, etc. Although an electric pitch change drive has been described, other drives can be used such as hydraulic or hydraulic-servo systems. It is believed, however that electric systems provide advantages in that there is no need, e.g. for a hollow crankshaft. It is believed an electric system is adaptable to a greater range of engines, to provide for ease of retro-fitting, and is simple to install and maintain, making it more feasible for use by the hobbyist or kit-builder. Although the pitch or other threshold may be a single pre-determined value, it is also possible to selector calculate the threshold depending on aircraft conditions, such as by providing a higher threshold when the propeller RPM is higher.

Although the invention has been described by way of a preferred embodiment in certain variations and modifications other variations and modifications can also be used, the invention being defined by the following claims.

What is claimed is:

1. Apparatus usable for controlling pitch of an aircraft, comprising:
   a pitch change driver, coupled to said propeller which is controllable, in response to a first control signal, to selectively change pitch of said propeller at a first rate when said first control signal has a first value and a second, faster rate when said control signal has a second value;
   a sensor, coupled to said propeller, which outputs a sensor signal indicative of whether the current pitch exceeds a first pitch threshold value;
   a controller, coupled to said pitch change driver, which receives said sensor signal and outputs said second value of said first control signal only when sensor signal indicates a current pitch below said threshold value.

2. Apparatus as claimed in claim 1 wherein said second rate is about one degree of pitch per second.

3. Apparatus as claimed in claim 1 wherein said first rate is about ⅓ degree of pitch per second.

4. Apparatus as claimed in claim 1 wherein said threshold value is about 10°.

5. Apparatus as claimed in claim 1 further comprising a display for providing a distinctive display output when negative pitch conditions are reached.

6. Apparatus as claimed in claim 5 wherein said display also provides display of at least one operating parameter of the aircraft in addition to a negative pitch condition.

7. Apparatus as claimed in claim 1, further comprising a display for indicating propeller pitch.

8. Apparatus as claimed in claim 1, wherein said first control signal is determined in response to sensed aircraft conditions.

9. Apparatus as claimed in claim 1 further comprising:

a propeller assembly having a first drivable shaft, wherein driving of said first shaft causes a change in the pitch of said propeller;

an electric motor, coupled to said first drivable shaft, for driving said first drivable shaft at at least first and second different rates.

10. Apparatus as claimed in claim 9, wherein said electric motor is selectably coupled to first or second voltage levels, for driving said first shaft at said first and second rates.

11. Apparatus usable for controlling pitch of an aircraft propeller, comprising:

first means, coupled to said propeller, for changing pitch of said propeller at a first rate when a first control signal has a first value and for changing pitch of said propeller at a second, faster rate when said first control signal has a second value;

second means, coupled to said propeller, for sensing whether the current pitch exceeds a first pitch threshold value; and third means, coupled to said second means, for preventing output of said second value of said first control signal to said first means unless said second means senses a current pitch below said first pitch threshold value.

12. Apparatus as claimed in claim 11, wherein said first means includes a controllable electric motor.

13. Apparatus as claimed in claim 11, wherein said second means includes a potentiometer.

14. Apparatus as claimed in claim 11, wherein said third means includes a programmed computer.

15. Apparatus as claimed in claim 11, further comprising a display for providing a distinctive display output when negative pitch conditions are reached.

* * * * *